(12) United States Patent
Ralls et al.

(10) Patent No.: US 8,589,874 B2
(45) Date of Patent: Nov. 19, 2013

(54) VISUAL INTERFACE TO REPRESENT SCRIPTED BEHAVIORS

(75) Inventors: Jason Ralls, Seattle, WA (US); Vinay Krishnaswamy, Woodinville, WA (US); Bartosz Gulik, Seattle, WA (US); Ravipal Soin, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1655 days.

(21) Appl. No.: 11/760,939

(22) Filed: Jun. 11, 2007

(65) Prior Publication Data

US 2008/0307388 A1 Dec. 11, 2008

(51) Int. Cl.
*G06F 9/44* (2006.01)
*G06F 3/00* (2006.01)

(52) U.S. Cl.
USPC ........... 717/115; 717/106; 717/109; 717/114; 715/705; 715/708

(58) Field of Classification Search
None
See application file for complete search history.

(56) References Cited

U.S. PATENT DOCUMENTS

| | | | |
|---|---|---|---|
| 5,623,657 A * | 4/1997 | Conner et al. | 719/320 |
| 5,862,379 A * | 1/1999 | Rubin et al. | 717/109 |
| 6,078,743 A | 6/2000 | Apte et al. | |
| 6,237,135 B1 | 5/2001 | Timbol | |
| 6,292,186 B1 * | 9/2001 | Lehman et al. | 715/705 |
| 6,466,240 B1 | 10/2002 | Maslov | |
| 6,701,514 B1 | 3/2004 | Haswell et al. | |
| 6,826,745 B2 * | 11/2004 | Coker et al. | 717/115 |
| 6,842,755 B2 * | 1/2005 | Maslov | 717/115 |
| 7,159,185 B1 * | 1/2007 | Vedula et al. | 715/763 |
| 7,176,917 B1 | 2/2007 | Morgan et al. | |
| 7,380,237 B2 * | 5/2008 | Goring et al. | 717/115 |
| 8,015,546 B2 * | 9/2011 | Jones et al. | 717/109 |
| 8,316,349 B2 * | 11/2012 | Morozov et al. | 717/115 |

(Continued)

FOREIGN PATENT DOCUMENTS

| | | |
|---|---|---|
| WO | WO0049498 A1 | 8/2000 |
| WO | WO0161483 A2 | 8/2001 |

OTHER PUBLICATIONS

Taosong He et al., "Constructing Interactive Network Visual Interfaces", [Online], Aug. 2002, pp. 47-57, [Retrieved from Internet on Jul. 11, 2013] <http://onlinelibrary.wiley.com/doi/10.1002/bltj.2104/pdf>.*

(Continued)

*Primary Examiner* — Thuy Dao
*Assistant Examiner* — Ziaul A Chowdhury
(74) *Attorney, Agent, or Firm* — Alleman Hall McCoy Russell & Tuttle LLP

(57) ABSTRACT

Systems and methods for visually representing scripted behaviors are provided. A system is disclosed that includes an authoring program executable on a computing device and configured to display a visual scripting interface. The visual scripting interface may be configured to display a plurality of user-selectable graphical building blocks. Each graphical building block may represent a respective component of a script, and may be spatially arrangable within the visual scripting interface to visually represent a script for a target scripted object. Input selectors may be provided on the graphical building blocks to enable users to input script information, and status indicators and messages may also be displayed on the graphical building blocks to inform users whether script information has been properly inputted. Propagation tools may be provided to enable users to successively add new graphical building blocks to build a tree that represents a script sentence.

13 Claims, 9 Drawing Sheets

(56) References Cited

U.S. PATENT DOCUMENTS

| | | | | |
|---|---|---|---|---|
| 2004/0027379 | A1* | 2/2004 | Hong Huey et al. | 345/764 |
| 2004/0085359 | A1* | 5/2004 | Steg et al. | 345/771 |
| 2005/0257198 | A1* | 11/2005 | Stienhans et al. | 717/124 |
| 2005/0283758 | A1* | 12/2005 | Cobcroft et al. | 717/113 |
| 2006/0070025 | A1* | 3/2006 | Mauceri et al. | 717/106 |
| 2006/0129379 | A1* | 6/2006 | Ramsey et al. | 704/9 |
| 2006/0190184 | A1 | 8/2006 | Sasinowski et al. | |
| 2006/0190771 | A1 | 8/2006 | Hefner | |
| 2006/0277194 | A1 | 12/2006 | Britt et al. | |
| 2008/0052672 | A1* | 2/2008 | Tatsumi | 717/114 |
| 2010/0057600 | A1* | 3/2010 | Johansen et al. | 705/37 |
| 2010/0107075 | A1* | 4/2010 | Hawthorne et al. | 715/708 |
| 2010/0241990 | A1* | 9/2010 | Gabriel et al. | 715/810 |

OTHER PUBLICATIONS

Randall Bramley et al., "A Component Based Services Architecture for Building Disributed Application", [Online], IEEE—2000, pp. 1-9, [Retrieved from Internet on Jul. 12, 2013], <http://citeseerx.ist.psu.edu/viewdoc/download?doi=10.1.1.33.4927&rep=rep1&type=pdf>.*

Marc Abrams et al., "UIML: an appliance-independent XML user interface language", [Online], 1999, pp. 1695-1708, [Retrieved from Internet on Jul. 12, 2013], <http://ac.els-cdn.com/S1389128699000444/1-s2.0-S1389128699000444-main.pdf>.*

Katherine Howland., "Script Cards: A Visual Programming Language for Games Authoring by Young People", [Online], 2006, pp. 1-4, [Retrieved from Internet on Jul. 12, 2013], <http://ieeexplore.ieee.org/stamp/stamp.jsp?tp=&arnumber=1698783>.*

"IBM Workplace Designer V2.5—The Fastest Way to Create Components for IBM Workplace Applications", available at least as early as Mar. 30, 2007, at <<http://www-306.ibm.com/common/ssi/fcgi-bin/ssialias?subtype=ca&infotype=an&appname=iSource&supplier=897&letternum=ENUS205-194>>, Aug. 23, 2005, pp. 1-10.

"Perl Builder 2.0 Standard Scripting Tool for Windows", available at least as early as Mar. 30, 2007, at <<http://www.solutionsoft.com/perl.htm>>, pp. 1-3.

"Pert-Raiser CGI Generator", available at least as early as Mar. 30, 2007, at <<http://www.bigwebmaster.com/1683.html>>, pp. 1-3.

"Visual Programming System (VPS)", available at least as early as Mar. 30, 2007, at <<http://www.msri.org/about/sgp/jim/software/vps/desc/node2.html>>, May 30, 1996, pp. 1-4.

* cited by examiner

VISUAL INTERFACE TO REPRESENT SCRIPTED BEHAVIORS

BACKGROUND

Many computer programs offer users the ability to write scripts using a scripting programming language to perform complicated or repetitive tasks. In some applications, scripts are written and interpreted within the environment of the computer program itself, and in other applications scripts are written within an authoring program for execution by another interpreting program, such as a browser. While scripting may extend the capabilities of many computer programs in powerful ways, the process of programming scripts is complicated and exacting, and often beyond the competency of the average user who is not a professional software developer. In the field of educational software, for example, learners often possess a passion for self-expression and representation of ideas that outpaces their familiarity with the exacting requirements of scripting programming languages, leaving them unsatisfied with their ability to represent their ideas using scripting tools of conventional software products.

SUMMARY

The present disclosure relates to systems and methods by which scripting behaviors may be visually represented and manipulated through graphical building blocks, so that they are more easily understood by users. A system is disclosed that includes an authoring program executable on a computing device and configured to display a visual scripting interface. The visual scripting interface may be configured to display a plurality of user-selectable graphical building blocks. Each graphical building block may represent a respective component of a script, and may be spatially arrangable within the visual scripting interface to visually represent a script for a target scripted object. Input selectors may be provided on the graphical building blocks to enable users to input script information, and status indicators and messages may also be displayed on the graphical building blocks to inform users whether script information has been properly inputted. Propagation tools may be provided to enable users to successively add new graphical building blocks to build a tree that represents a script sentence.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
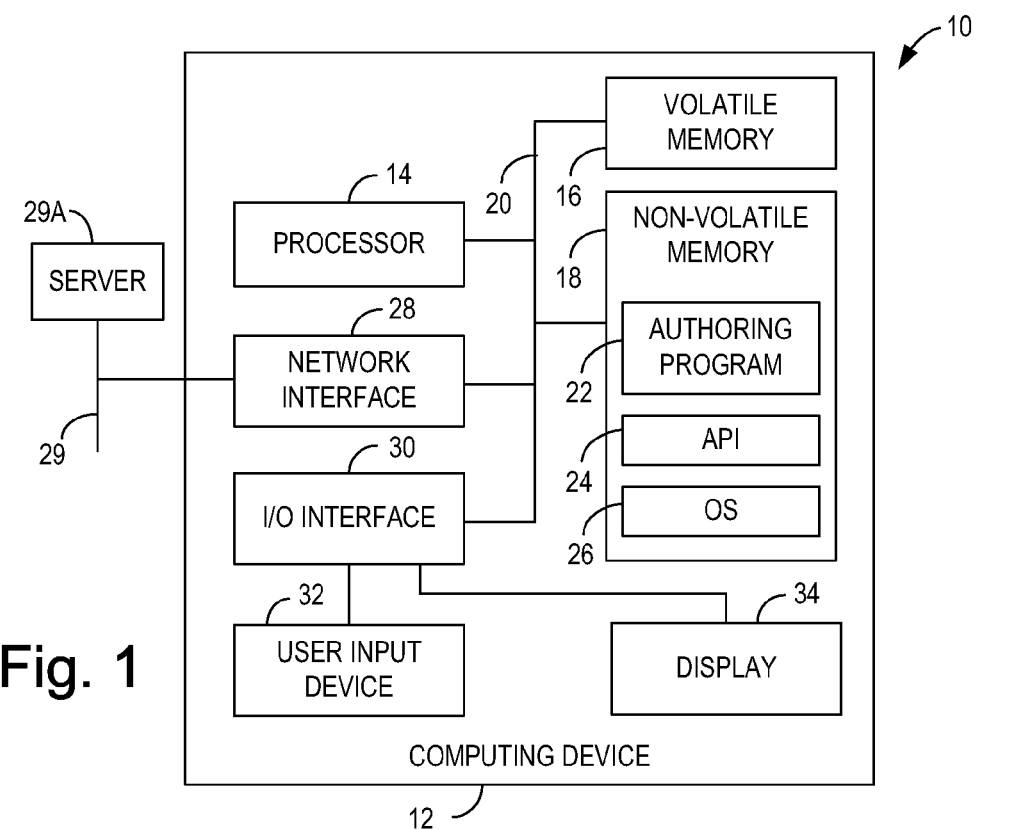
FIG. 1 is a schematic view of one embodiment of a system for visual representation of scripted behaviors.

FIG. 1 illustrates an embodiment of a system 10 for visual representation of scripted behaviors. System 10 typically includes a computing device 12 having a processor 14 linked for communication with volatile memory 16 and non-volatile memory 18 by a bus 20. Computer software such as authoring program 22, application programming interface 24, and operating system 26 may be stored in non-volatile memory and may be executed by processor 14 using portions of volatile memory 16. It will be appreciated that volatile memory may be random access memory (RAM), and non-volatile memory may be a mass storage device such as a hard drive, flash memory, read-only memory, etc. A network interface 28 may be provided to facilitate communication with other computing devices such as a server 29A, across a network 29. An input output interface may also be provided to facilitate communication with a user input device 32, such as a mouse or keyboard, and with a display 34.

Figure 2:
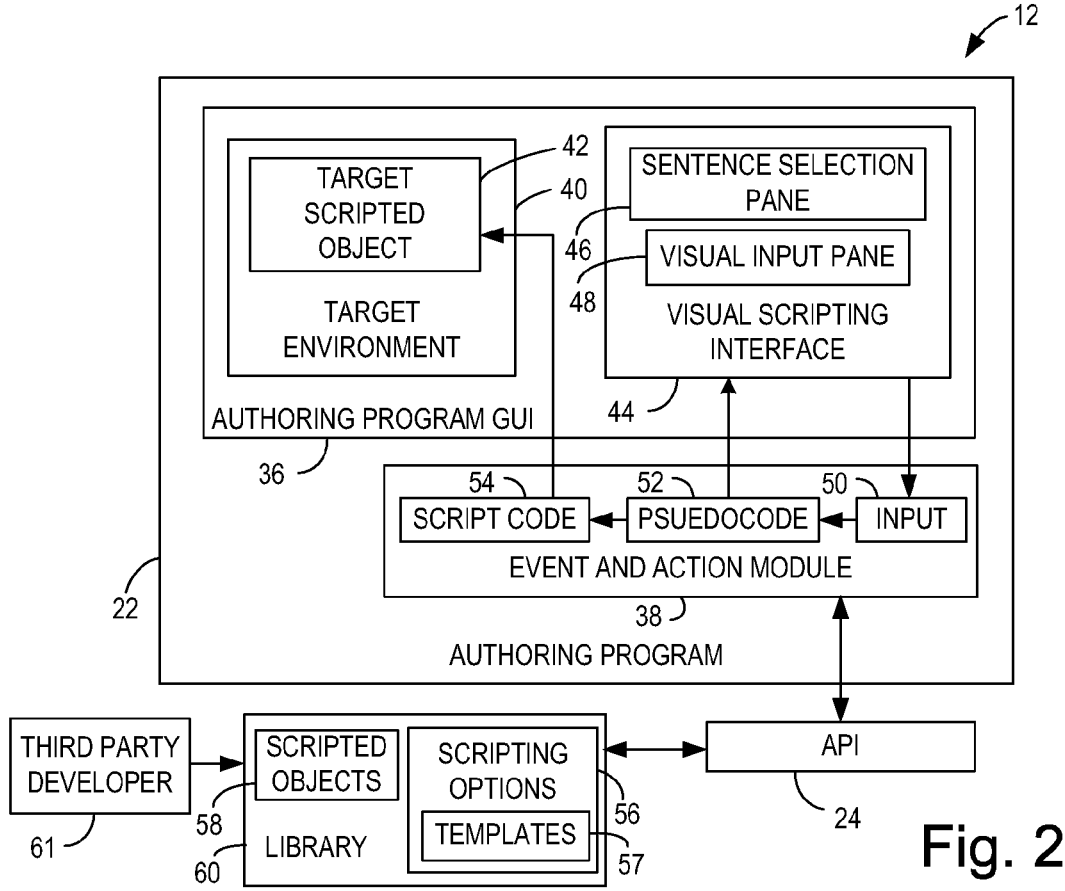
FIG. 2 is a schematic view of an authoring program of the system of FIG. 1.

As shown in FIG. 2, authoring program 22 typically is configured to display an authoring program graphical user interface (GUI) 36, and includes an associated event and action module 38 in communication with authoring program GUI 36. The authoring program may, for example, be configured to enable a user to create a target environment 40 that includes a target scripted object 42. The target environment 40 may be, for example, a presentation or website displayable via a browser or other interpreter software.

To enable the user to create a script for the target scripted object 42, the authoring program GUI 36 is configured to present a visual scripting interface 44 including a sentence selection pane 46 by which the user may select an input method for inputting a sentence that the script will follow, for example by sentence template or custom input. Once the input method is selected, the visual scripting interface 44 is configured to present a visual input pane 48 configured to enable a user to graphically enter user input 50, which may include an arrangement and content of graphical building blocks representing action, events and conditions, to produce a script.

The user input 50 is sent from the visual scripting interface 44 to the event and action module 38, which in turn processes the user input 50 to produce script code 54 for a completed script. The script code 54 for the completed script is sent from the event and action module 38 to the target scripted object 42. During processing of the user input, the event and action module 38 may also be configured to produce pseudocode 52 based on the user input. The pseudocode 52 may include a natural language description of a scripting step included in the user input. The pseudocode 52 may be sent to the visual scripting interface from the event and action module 38 for display to the user.

In some embodiments, the processing of the user input 50 to produce pseudocode 52 or script code 54 may be performed all or in part by API 24. It will be appreciated that the portions of API 24 may be public, thereby enabling third party software developers 61 to create target scripted objects 42 with associated scripting options 56 that are passed into the event and action module 38 via the API 24. The scripting options 56 may be stored with associated scripted objects 58 in a library 60 in non-volatile memory 18 of the computing device 12, or at other location accessible via computer network 29. The scripting options 56 may be passed to the visual scripting interface and presented to the user for selection during the script building process, as described below. Alternatively, the library may be accessed directly by the components of authoring program 22, rather then through API 24. Using the pre-developed scripted objects 58 stored in library 60, users may select a desired scripted object 58 from the library 60 for inclusion in as a target scripted object 42 in a project, and may select from among the associated scripting options 56 to control scripting behavior of the target scripted object 42 in a desired manner, saving time and complication over creating a target scripted object 42 from scratch. Scripting options 56 may include, for example, templates 57 of pre-arranged building blocks that may or may not be associated with a target scripted object. Thus, a user may either select a desired scripted object 42, or a template 57, to begin script building. It will be appreciated that the scripted objects 58, scripting options 56, and templates 57 are designed according to a schema known to the API 24, developer 61, and authoring program 22. This schema enables standardized communication between the developer 61, API 24 and authoring program 22, regarding these data types.

To enable the user to easily locate a desired scripting option 56, the various scripting options 56, including templates 57 and building blocks, may be embedded with metadata indicating, for example, their content type, function, usage, etc. A search tool may be provided to enable the user to search the scripting options, including the templates 57 and building blocks, based on the metadata.

Figure 3:
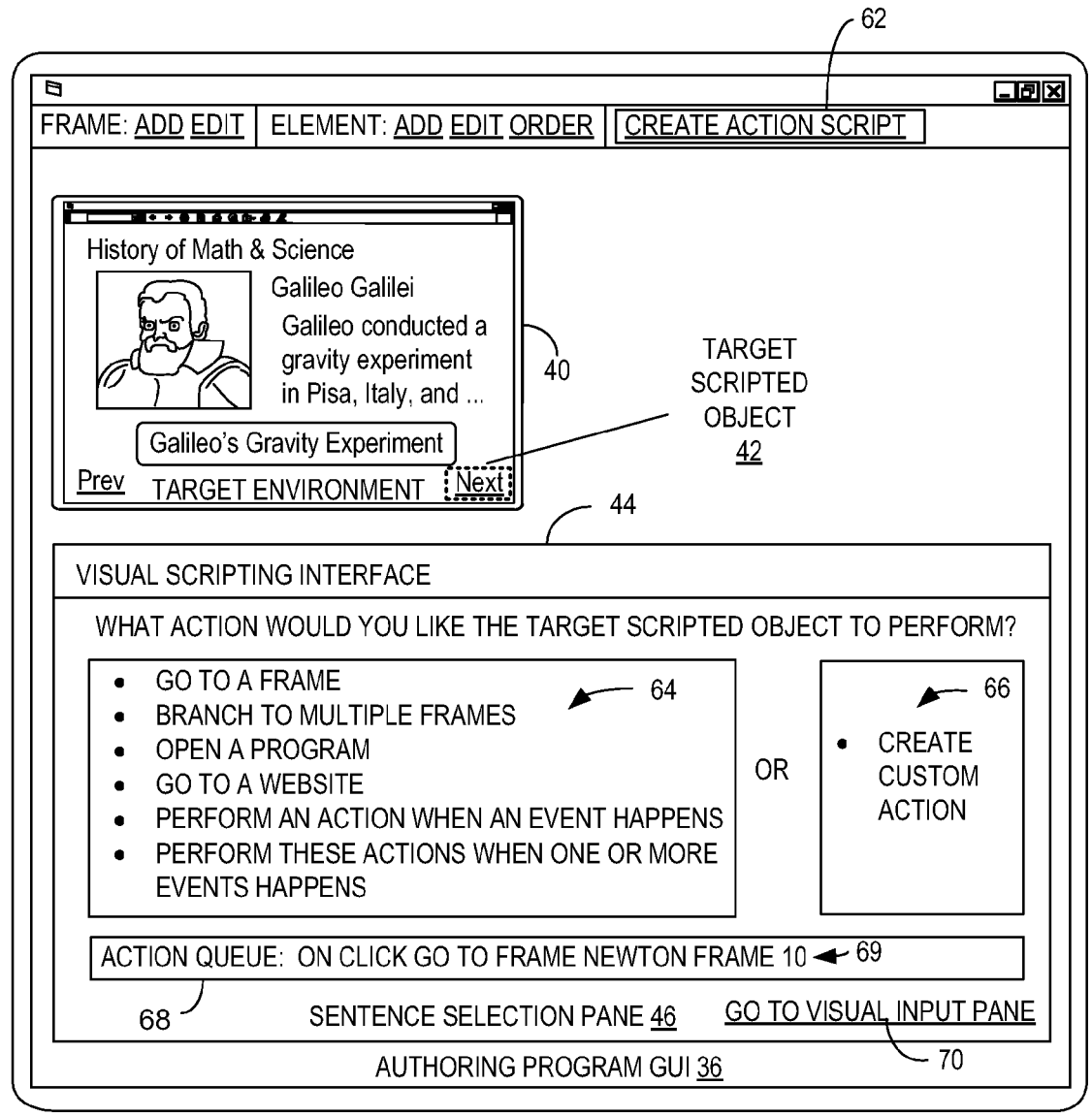
FIG. 3 is a schematic view of a graphical user interface of the authoring program of the system of FIG. 1, featuring a sentence selection pane.
Figure 7:
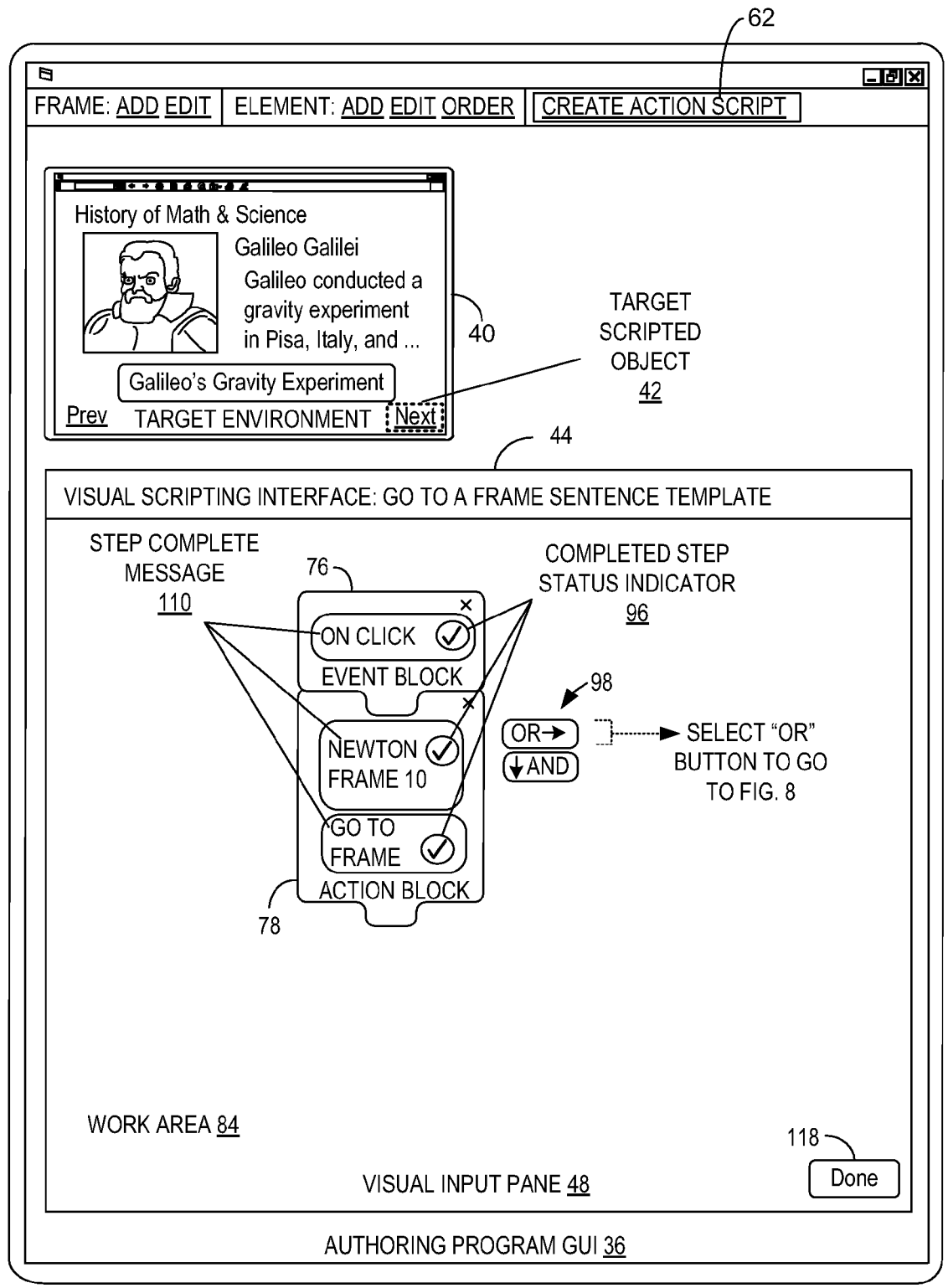
FIG. 7 is another schematic view of the visual scripting interface of FIG. 6, showing all steps for the displayed graphical building blocks complete.

FIG. 3 illustrates one embodiment of authoring program GUI 36. A user may select a target scripted object 42 from target environment 40, and then select a create action script selector 62, to cause a sentence selection pane 46 of visual scripting interface 44 to be displayed. The sentence selection pane 46 typically includes a list of one or more sentence templates 64, from which a user may select a desired sentence template upon which to build a script for the target scripted object 42. A variety of sentence templates 64 may be provided, including "go to a frame," branch to multiple frames," "open a program," "go to a website," "perform an action when an event happens," and "perform these actions when one or more events happen." A custom action selector 66 is also provided, which enables the user to build a script from scratch, without a template. An action queue 68 is provided for displaying any other scripts that may have been previously created for the target scripted object. In the depicted embodiment a natural language sentence 69 for the script represented in FIG. 7 is depicted in the action queue 68.

Upon selection of a sentence template 64 or custom action selector 66 by a user, the visual input pane 48 of visual scripting interface 44 is displayed, to enable the user to graphically assemble the script. Alternatively, once the user has selected an input method from sentence templates 64 and custom action selector 66, the user may traverse a link 70 to navigate to the visual input pane 48 of visual scripting interface 44.

Figure 4:
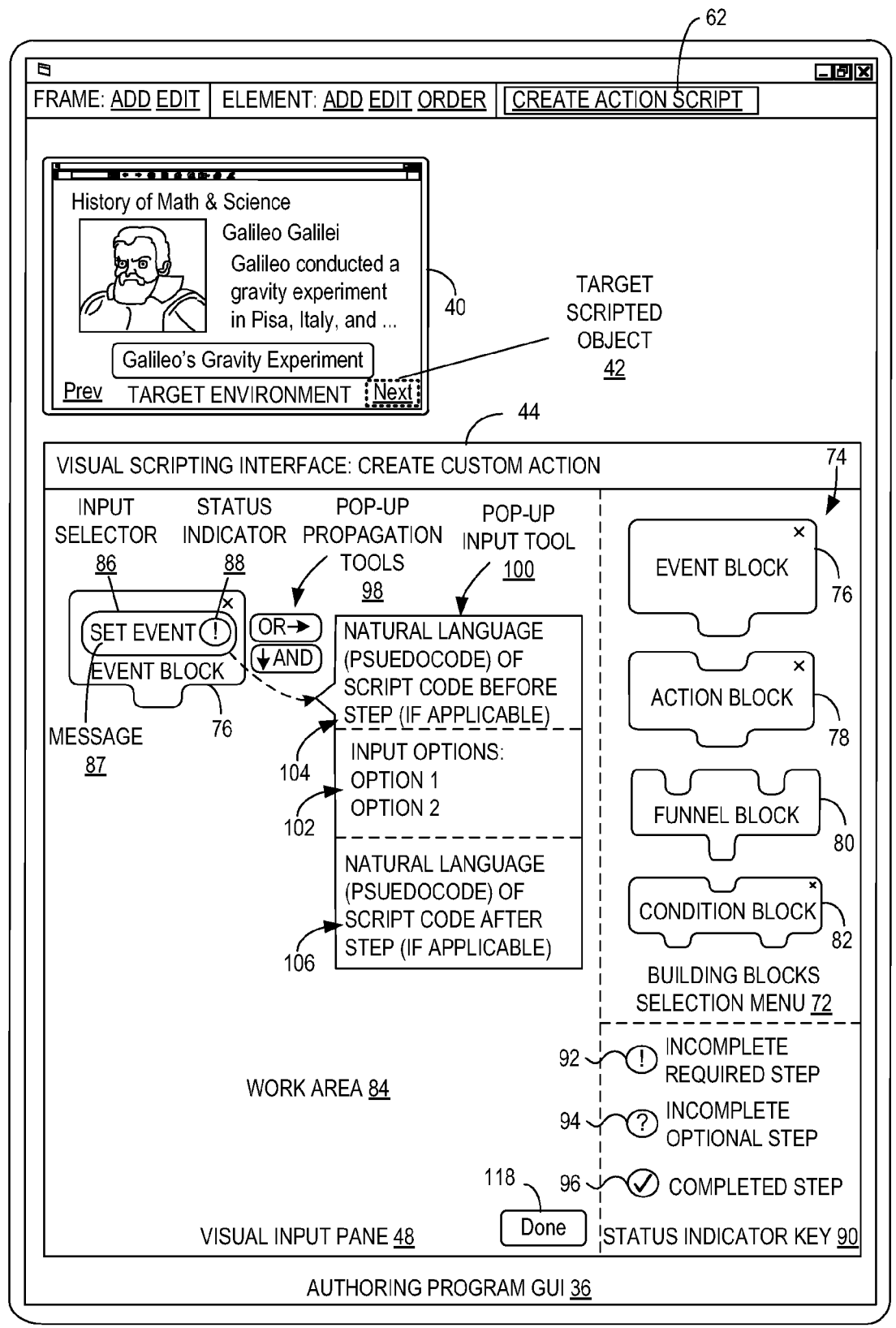
FIG. 4 is a schematic view of a graphical user interface of the authoring program of the system of FIG. 1, featuring a visual scripting interface configured for input of custom actions.

FIG. 4 illustrates a visual input pane 48 of visual scripting interface 44, configured to enable creation of a custom action, which is configured to appear upon selection of custom action selector 66. Visual scripting interface 44 is configured to display a plurality of user-selectable graphical building blocks 74, each graphical building block representing a respective component of a script. Icons representing the user-selectable graphical building blocks 74 are provided within a building blocks selection menu 72. The graphical building blocks 74 may be selected from the building blocks selection menu 72, and spatially arranged within the visual input pane 48 of the visual scripting interface 44 to visually represent a script for a target scripted object. For example, a user may drag one of these icons to a work area 84 of the visual input pane 48, to introduce the graphical building block into the sentence for the current script, in the create custom action mode.

The graphical building blocks 74, for example, may include event blocks 76, action blocks 78, event funneling blocks 80, and condition blocks 82. Event blocks 76 identify the event that the current script will be triggered by. A user may choose a desired event for each event block 76, and the events to choose from may be drawn from scripting options 56 for the target scripted object. Action block 78 represents a component of a script sentence, visually grouping a target, an action, and properties for the action into one graphical building block. Event funneling block 80 indicates that multiple events will result in the actions that follow it. For example, an event funneling block may be used underneath an Event 1 block, Event 2 block, and Event 3 block to specify that the occurrence of any of these three events will result in an Action 1 block that follows the event funneling block 80. Condition block 82 is a block that contains a condition for deciding which of a plurality of paths to action blocks to follow. Thus, a condition block 82 will typically include two or more action blocks 78 following it. Upon selection of the create custom action option 66 on sentence selection pane 46, the visual input pane may be configured to display a single event block 76, or an event block 76 and action block 78 pair, for example, to get the user started.

Figure 5:
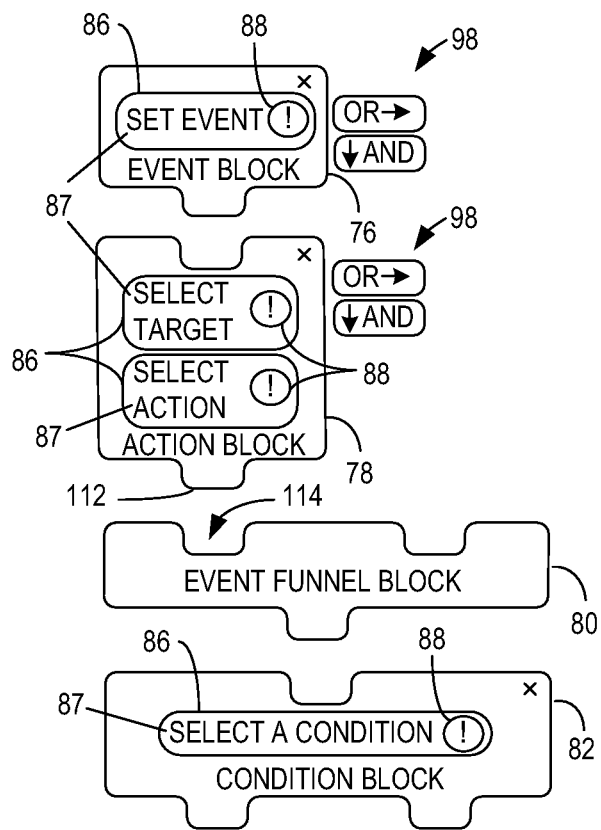
FIG. 5 is a schematic view of graphical building blocks used in the visual scripting interface of the system of FIG. 1.

As illustrated in FIGS. 4 and 5, some of the graphical building blocks 74, such as the event block 76 and the action block 78, may include an input selector 86 configured to enable a user to enter user input script information. The input selector 86 may also be configured to display a message 87 regarding a status of a step of the building block. Alternatively, the graphical building block may be configured to display the message 87 in an area other than on the input selector 86.

Figure 6:
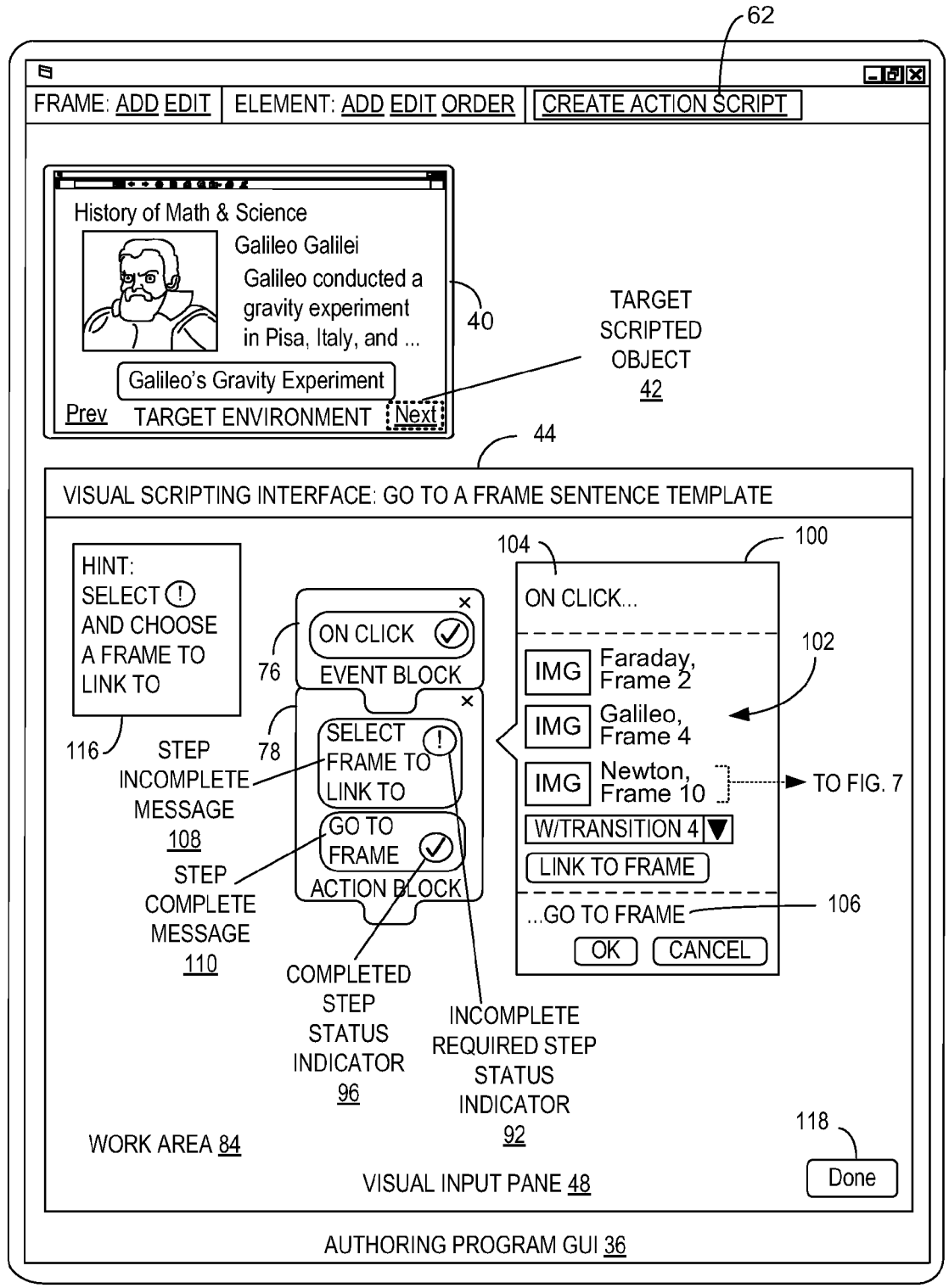
FIG. 6 is a schematic view of a graphical user interface of the authoring program of the system of FIG. 1, featuring a visual scripting interface configured for input based on a "go to a frame" sentence template selected from the sentence selection pane of FIG. 3.

In addition, some of the graphical building blocks, such as the event block 76, action block 78, and condition block 82, may also include a status indicator 88 configured to indicate whether required or optional script information has been inputted by the user. A status indicator key 90 may be provided within visual input pane 48, to enable a user to easily understand the meaning of the status indicators 88. In the illustrated embodiment, the status indicators 88 include an incomplete required step status indicator 92, an incomplete optional step status indicator 94, and a completed step indicator 96. A user may scan these status indicators 88 to quickly determine whether a script for an action has been completed, or whether further script information should be inputted by the user. Further, as illustrated in FIG. 6, messages 87 may include a step incomplete message 108 and a step complete message 110. The step incomplete message 108 may include a textual description of script information to be entered by a user, while the step complete message 110 may include a summary of the script information previously entered by the user, or preloaded automatically based on script options 56 for the target scripted object 42.

Returning to FIGS. 4-5, some of the graphical building blocks, such as the event block and action block, may also include associated propagation tools 98, configured to further propagate building blocks in a visual representation of a script sequence within the visual input pane. The propagation tools 98, for example, may be configured to appear adjacent the graphical building block on mouseover of the building blocking itself. Alternatively, the propagation tools 98 may appear within the graphical building block, or in some other suitable location. In the illustrated example, propagation tools 98 include an AND propagation tool and an OR propagation tool. Selection of the AND creates a new block of the same type connected to the current block, beneath it, and thus logically after it. Selection of the OR propagation tool creates a new block of the same type adjacent (for example, to the right) of the current block, and generates a condition block above the current and new blocks. If the current block already has a condition block connecting it to another, that condition block expands by one more slot to accommodate a third block as part of the branch.

Selection of the input selector 86 may cause an input tool 100 to be displayed. The input tool 100 may be a pop-up window, for example, or other suitable type of input mechanism such as a pull down menu, etc. Alternatively, the input tool 100 may be displayed within the graphical building block itself.

The input tool 100 may include a list of user selectable input options 102, or alternatively may be configured for direct user input. It will be appreciated that the list of user selectable input options 102 may be at least partially populated based on data associated with the target scripted object 42, such as the script options 56 saved in library 60. The input tool 100 is configured to display a first natural language representation 104 of one or more steps of the script occurring before the list of user selectable input options for the current step of the current block, and/or a second natural language representation 106 of one or more steps of the script occurring after the list of user selectable input options.

As illustrated in FIG. 5, the graphical building blocks may have interlocking regions, such as protrusion 112 and concavity 114, which are configured to provide visual position cues, and facilitate relative positioning of the graphical building blocks within the visual scripting interface by a user. It will be appreciated that the shape of the protrusion 112 and concavity 114 may be modified to any suitable shape. Further, the shape of each of the graphical building blocks may be modified to other suitable shapes. Thus, it should be understood that the term "blocks" as used herein refers to interrelated scripting "units" rather than to the rectangular shape of the blocks, as other shapes are possible.

FIG. 6 illustrates the visual scripting interface 44 as it is presented upon selection of a "go to a frame" template option from among sentence templates 64 on sentence selection pane 46. For each event block 76, a triggering event should be specified. For each action block, a target object, such as an element, frame, or activity in the authoring program 22, an action, and an argument to the action, such as a transition type, should be specified. Here, since the "go to frame" sentence template has been selected, an event block and action block pair are presented in visual input pane 48, with the event preloaded as "on click" into the event block, and the action "go to frame" also preloaded into the action block, based scripting options 56 associated with the "go to a frame" sentence template. Here, step completed message 110 and completed step status indicator 96 tell the user that event block 76, and the "go to frame" substep of action block 78 have been completed. Step incomplete message 108 and incomplete required step status indicator 92 visually inform the user that additional script information must be entered for the script to be completed. In addition, the visual scripting interface 44 is configured to display a hint box 116 containing a hint for inputting script information.

The visual scripting interface 44 is configured to display input tool 100, with narrative descriptions 104 and 106, as well as a list of input options 102, from which the user may select a desired option. In the depicted embodiment the list of input options 102 includes a plurality of frames to which the script may link, as well as a selector for selecting a transition between frames, preloaded to the option "transition 4". Upon selection of the input option "Newton, Frame 10," and following a click of the OK button on input tool 100, the visual scripting interface 44 transitions to the view in FIG. 7.

As shown in FIG. 7, the status indicator and messages for the target step of action block 78 have been changed due to the user input discussed above, and now completed step status indicators 96 and step complete messages 110 appear on all items within event block 76 and action block 78. At this point, the user has the option of clicking a "done" selector 118, to add the script to the target scripted object 42 for which it was created, and the user is returned to the view of the sentence selection pane 46, shown in FIG. 2. Or, the user may select AND or OR propagation tools 98 to further modify the script, by generating additional blocks in a tree-like arrangement representing the desired script logic. Individual graphical building blocks may be selected and dragged by a user, or for more complicated scripts, entire sections of a tree may be moved by selecting and dragging, with everything beneath the selected block coming along with the drag operation. The work area 84 of the visual input pane 48 can be scrolled if the script exceeds the borders of the view. Further, the script can also be zoomed in and out so the user can see the big picture or focus in on one area.

Figure 8:
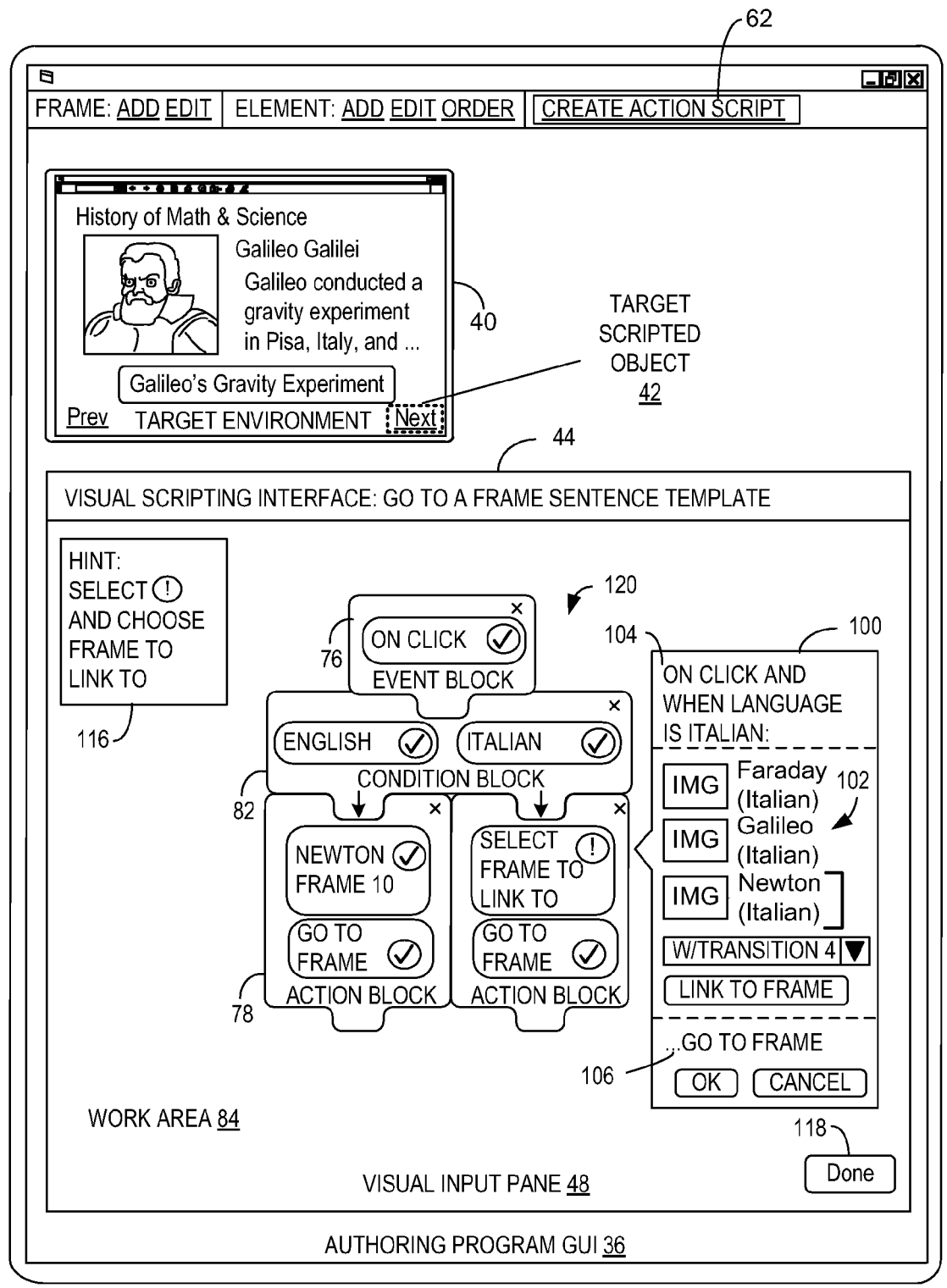
FIG. 8 is another schematic view of the visual scripting interface, showing a conditional block added to the graphical building blocks of FIG. 7.

Upon selection of OR propagation tool 98 in FIG. 7, the visual scripting interface 44 is configured to present a view as shown in FIG. 8, including a branching condition block 82. In the depicted embodiment, the condition block has been filled in by the user, and is configured to branch if the detected language of the user is English, to Newton Frame 10, and if the detected language of the user is Italian, to an as yet unspecified frame. An input tool 100 may be displayed, with first and second narrative descriptions 104, 106 of steps before and after the current step, and a list of input options 102 from which the user may choose a target frame, and a desired transition type. By selecting the Newton (Italian) option, the user may create a script that branches to an Italian version of the Network frame, upon detecting the condition that the language of the user is Italian. It should also be appreciated that advance planning of the logic flow is not required, since the OR propagation tool may be used to create a branch in operational logic within an existing arrangement of building blocks.

It will be appreciated that the resulting arrangement of graphical building blocks may be referred to as a tree 120, and that this tree expresses a logical process flow through events, actions, and conditions, which may be represented by a script sentence 69. While the term "tree" implies the possibility of branching, it will be appreciated that herein the term "tree" may be used to describe an arrangement of scripted graphical building blocks even if the arrangement is not branching, such as is the case in the arrangement depicted in FIG. 7.

Figure 9:
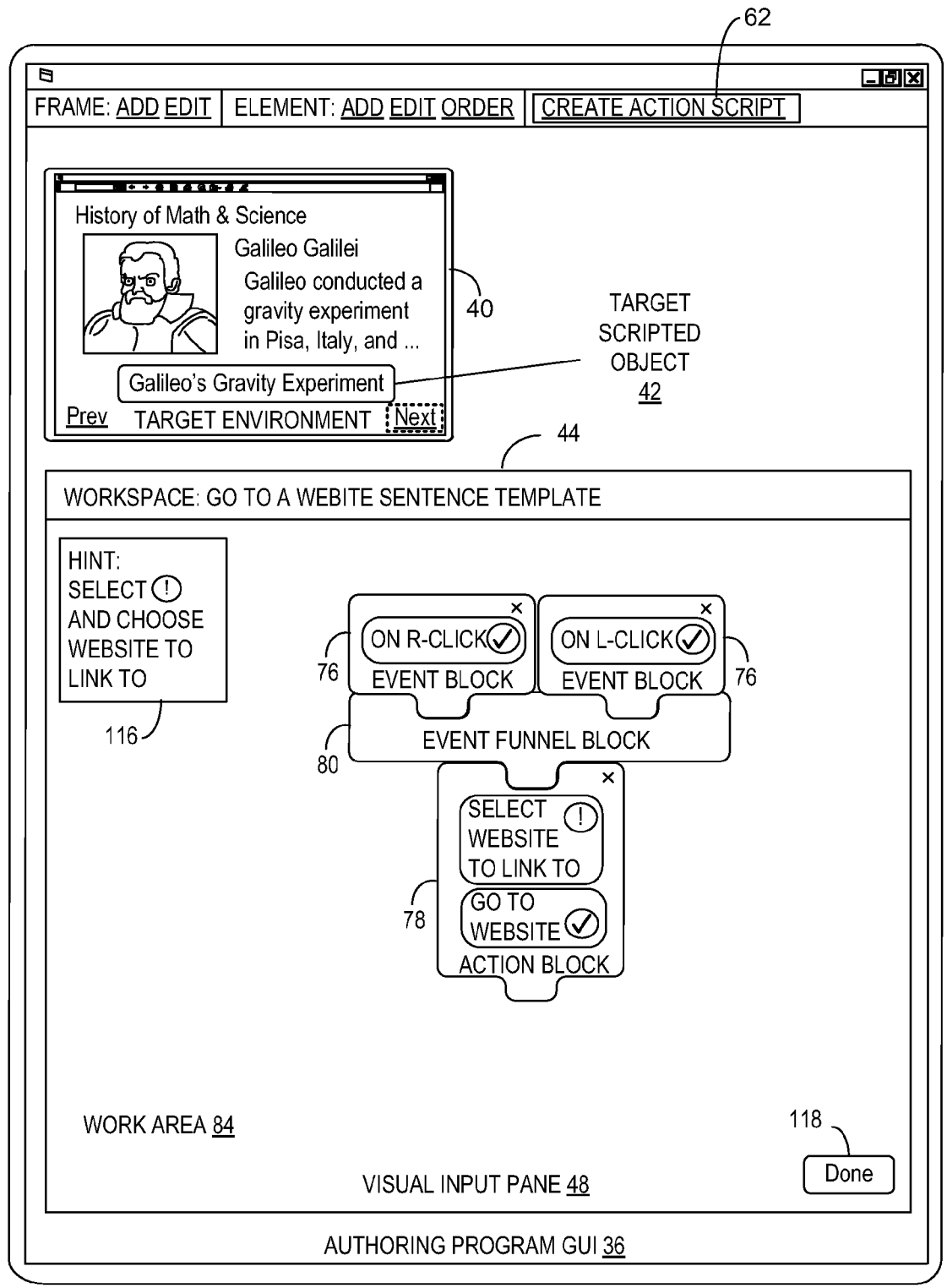
FIG. 9 is a schematic view of a graphical user interface of the authoring program of the system of FIG. 1, featuring a visual scripting interface configured for input based on a "go to a website" sentence template selected from the sentence selection pane of FIG. 3.

FIG. 9 illustrates an example of visual scripting interface 44, upon selection of a "go to a website" sentence template from among sentence templates 64 on sentence selection pane 46, for a target scripted object 42, which in FIG. 9 is a button entitled "Galileo's Gravity Experiment". In the depicted tree, an event funneling block 80 is used to funnel two event blocks 76, which detect trigger events of a right click and left click of a mouse. As a result, on either right click or left click of the mouse, the resulting script will cause the browser to navigate to-be-specified website in the action block 78. Once the user selects a website to link to, as suggested by hint box 116, the user may select "done" button 118 to assign the script to the target scripted object 42.

Figure 10:
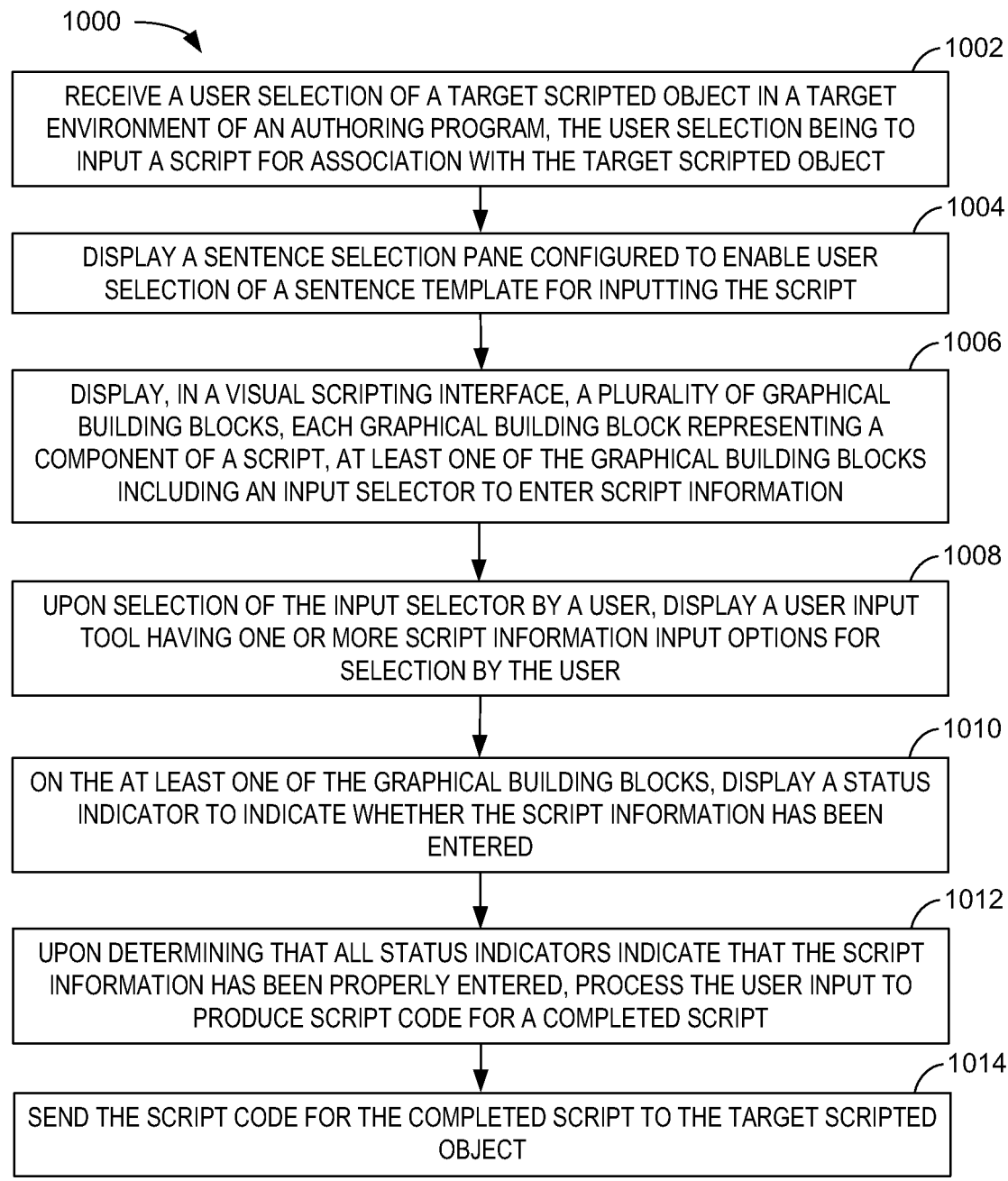
FIG. 10 is a flowchart of one embodiment of a method for visual representation of scripted behaviors.

FIG. 10 depicts one embodiment of a method 1000 for visually representing a scripted behavior. Method 1000 may be implemented by the systems and devices described above, or by other suitable systems and devices, as appropriate. At 1002, the method includes receiving a user selection of a target scripted objected in a target environment of an authoring program, the user selection being to input a script for association with the target scripted object. At 1004, the method includes displaying a sentence selection pane configured to enable user selection of a sentence template for inputting the script. At 1006, the method includes displaying, in a visual scripting interface, a plurality of graphical building blocks, each graphical building block representing a component of a script, at least one of the graphical building blocks including an input selector to enable a user to enter script information. The graphical building blocks may be event blocks, action blocks, condition blocks, and event funneling blocks, as described above.

At 1008, the method includes, upon selection of the input selector by a user, displaying a user input tool having one or more script information input options for selection by the user. The script information input options may be preloaded from a data store associated with the target scripted object. At 1010, the method includes, on the at least one of the graphical building blocks, displaying a status indicator to indicate whether the script information has been entered. To enable the user to continue adding building blocks, the method may also include displaying a propagation tool to the user, the propagation tool enabling a user to select a manner in which to expand the arrangement of building blocks representing the script, as described above. At 1012, the method includes, upon determining that all status indicators indicate that the script information has been properly entered, processing the user input to produce script code for a completed script. And, at 1014, the method includes sending the script code for the completed script to the target scripted object. It will be appreciated that the script may reside either on a client or server, as appropriate to the implementation environment.

The systems and methods described herein may be utilized within an authoring program, or other computer program, to enable users to efficiently create scripts to perform desired actions, through an interface that utilizes visual representation of scripted behaviors. Further, it should be appreciated that the systems and methods described herein may be used to provide support not only for users to create scripts in so-called beginning scripting languages, but also to extend the functionality of those scripts using more advanced and complicated scripting languages. For example, third party software developers 61 may provide advanced scripting templates 57, which can provided powerful functionality to the user using complex scripting languages, yet be represented and manipulated by the user using the building blocks described above.

It will be appreciated that the computing device described herein may be any suitable computing device configured to execute the programs and display the graphical user interfaces described herein. For example, the computing device may be a personal computer, laptop computer, portable data assistant (PDA), computer-enabled wireless telephone, networked computing device, or other suitable computing device, and may be connected to one or more computer networks, such as the Internet. As used herein the term "program" refers to software or firmware components that may be executed by, or utilized by, a computing device, and is meant to encompass individual or groups of executable files, data files, libraries, drivers, scripts, database records, etc. Further, it will be appreciated that the systems and method described above may be implemented in a client-server environment, and thus all or portions of the authoring program may be executed at a client computing device or at a server computing device, as appropriate. Thus the creation and arrangement of building blocks may be driven by code executable at the client and/or server, and the scripts produced by the authoring program may be stored and executed either at the client and/or at the server.

While the embodiments above describe the script being output as script code 54, it should be appreciated that the script may be written by the application program 22 in a scripting language that resembles a natural language. With a natural language type script language the user need not understand complicated code to be able to read the script. Further, the various messages displayed via the building blocks may closely resemble the natural language code. Input tools, such as a language dictionary, may be provided to assist the user in inputting parameters via the building blocks.

It should be understood that the embodiments herein are illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

The invention claimed is:

1. A processor implemented method for visually representing a scripting behavior, the method comprising:
   receiving a user selection of a target scripted object in a target environment of an authoring program, the user selection being to input a script for association with the target scripted object;
   displaying, in a visual scripting interface, a plurality of graphical building blocks, each building block representing a component of a script, at least one of the graphical building blocks including an input selector to enter script information, the graphical building blocks including event blocks, action blocks, condition blocks, and event funneling blocks;
   upon selection of the input selector by a user, displaying a user input tool having one or more script information input options for selection by the user, the input tool displaying a natural language representation of one or more steps of the script occurring before a list of user selectable input options or the natural language representation of one or more steps of the script occurring after the list of user selectable input options;
   on the at least one of the graphical building blocks, displaying a status indicator to indicate whether the script information has been entered;

receiving user input from the visual scripting interface at an event and action module of the authoring program, the user input including an arrangement and content of the plurality of graphical building blocks;

processing at the event and action module the user input to produce script code for a completed script; and sending the script code for the completed script to the target scripted object in the target environment of the authoring program.

2. The method of claim 1, further comprising:

displaying a propagation tool to the user, the propagation tool enabling a user to select a manner in which to expand an arrangement of building blocks representing the script.

3. The method of claim 1, wherein the script information input options are preloaded from a data store associated with the target scripted object.

4. The method of claim 1, further comprising, prior to displaying the graphical building blocks, displaying a sentence selection pane configured to enable user selection of a sentence template for inputting the script;

upon determining that all status indicators indicate that the script information has been properly entered, processing the user input to produce script code for a completed script; and sending the script code for the completed script to the target scripted object.

5. A system for visually representing a scripted behavior having memory linked for communication with a processor, comprising:

an authoring program executable on a computing device and configured to display an authoring program graphical user interface including a visual scripting interface, the visual scripting interface being configured to display a plurality of user-selectable graphical building blocks, each graphical building block representing a respective component of a script, the graphical building blocks being spatially arrangeable within the visual scripting interface to visually represent a script for a target scripted object, the graphical building blocks including event blocks, action blocks, condition blocks, and event funneling blocks;

wherein one or more of the graphical building blocks includes an input selector configured to enable a user to enter user input script information and selection of the input selector causes an input tool to be displayed, the input tool including a list of user selectable input options, the list of user selectable input options being at least partially populated based on script options associated with the target scripted object, the input tool being configured to display a natural language representation of one or more steps of the script occurring before the list of user selectable input options or the natural language representation of one or more steps of the script occurring after the list of user selectable input options; and wherein the authoring program further includes an event and action module configured to receive user input from the visual scripting interface of the authoring graphical user interface, the user input including an arrangement and content of the graphical building blocks, the event and action module being further configured to process the user input to produce script code for a completed script, and send the script code for the completed script to the target scripted object.

6. The system of claim 5, wherein each of the building blocks includes a status indicator configured to indicate whether script information has been inputted by the user.

7. The system of claim 5, wherein at least some of the building blocks include associated propagation tools, which are configured to further propagate building blocks in a visual representation of a script sequence.

8. The system of claim 5, wherein the propagation tools are selected from the group consisting of AND and OR buttons.

9. The system of claim 5, wherein the visual scripting interface is further configured to display a hint box containing a hint for inputting script information.

10. The system of claim 5, wherein the event and action module is further configured to process the user input to produce pseudocode including a natural language description of a scripting step included in the user input, and send the pseudocode to the visual scripting interface for display.

11. The system of claim 5, wherein the graphical building blocks including interlocking regions configured to facilitate relative positioning of the graphical building blocks within the visual scripting interface.

12. The system of claim 5, wherein the visual scripting interface is further configured to display a sentence selection pane including one or more sentence templates, and wherein the sentence is selected from among the sentence templates.

13. A system for visually representing scripted behaviors having memory linked for communication with a processor, the system comprising:

a computer program that when executed on a computing device is configured to display a visual scripting interface, the visual scripting interface including a plurality of user selectable graphical building blocks, each representing a scripting component, each of the graphical building blocks including an input selector to enter script information, and a status indicator to indicate whether the script information has been entered, wherein selection of the input selector causes a user input tool having one or more input options to be displayed for selection by the user, the graphical building blocks including event blocks, action blocks, condition blocks, and event funneling blocks and the input tool is configured to display a natural language representation of one or more steps of the script occurring before a list of user selectable input options or the natural language representation of one or more steps of the script occurring after the list of user selectable input options;

wherein the computer program further includes an event and action module configured to receive user input from the visual scripting interface, the user input including an arrangement and content of the graphical building blocks, the event and action module being further configured to process the user input to produce script code for a completed script, and send the script code for the completed script to a target scripted object in a target environment of the computer program.

* * * * *